Dec. 15, 1925.
L. RENO
1,565,958
CRANK SHAFT POLISHER
Filed March 8, 1924
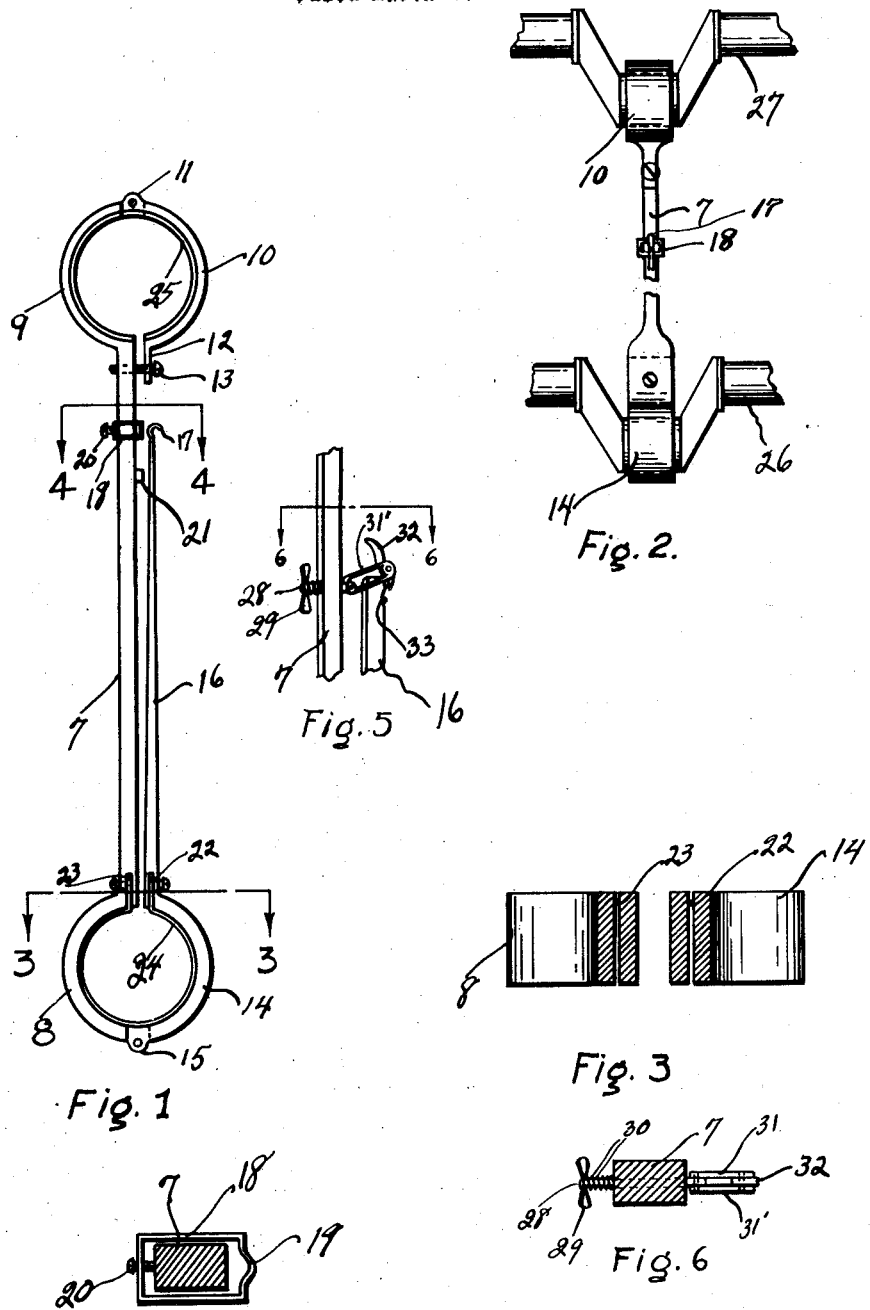
INVENTOR.
Leo Reno
BY
Thos S Donnelly
ATTORNEY.

Patented Dec. 15, 1925.

1,565,958

UNITED STATES PATENT OFFICE.

LEO RENO, OF FLINT, MICHIGAN.

CRANK-SHAFT POLISHER.

Application filed March 8, 1924. Serial No. 697,697.

*To all whom it may concern:*

Be it known that I, LEO RENO, a citizen of the United States, residing at Flint, in the county of Genesee and State of Michigan, have invented a new and useful Improvement in a Crank-Shaft Polisher, of which the following is a specification.

My invention relates to a new and useful improvement in a crank shaft polisher, and has for its object the provision of a crankshaft polisher adapted for operation mechanically, thus eliminating the necessity of manual operation during the polishing process.

Another object of the invention is the provision of a crankshaft polisher having a polishing medium carried by an arm adapted for rocking in unison with the crankshaft to be polished.

Another object of the invention is the provision of a crankshaft polisher which will be simple in structure, economical of manufacture and highly efficient in use.

Another object of the invention is the provision in a crankshaft polisher of a carrying arm having a swingable polishing member at one end adapted for attachment to the carrying member and provided at its opposite end with a divisible swingingly mountable bearing member.

Other objects will appear hereinafter.

The invention consists in the combination and arrangements of parts hereinafter described and claimed.

The invention will be best understood by a reference to the accompanying drawings which form a part of this specification and in which, Fig. 1 is a side elevational view of the invention, Fig. 2 is a front elevational view showing the invention mounted in oeprative position, Fig. 3 is a sectional view taken on substantially line 3—3 of Fig. 1, Fig. 4 is a sectional view taken on substantially line 4—4 of Fig. 1, Fig. 5 is a fragmentary side elevational view of a modified form of the invention, Fig. 6 is a sectional view taken on substantially line 6—6 of Fig. 5.

With crankshaft polisher as now used, it is customary for the operator to retain a carrying arm in his hands during the polishing operation. The result is that the operator is compelled to do a very fatiguing piece of work inasmuch as the arm which carries the polishing member is reciprocating relatively to him and at the same time travelling in a circle at one end. To eliminate this trying operation on the operator, the present invention is designed to operate mechanically in conjunction with the crankshaft operated upon.

The invention, in its preferred form, comprises a carrying arm 7 having a semi-circular portion 8 at one end and a similar portion 9 at the opposite end, these semi-circular portions 8 and 9 being formed preferably integral with the arm 7. Hingedly mounted to the portion 9, at 11, is a semicircular portion 10 having an angularly turned portion 12 through which is projected a set screw 13 threaded into a socket formed in the arm 7. The two members 9 and 10 when assembled in operative position constitute a circular bearing, the inner surface of which is provided with suitable wearing material, such as, babbitt, or a bearing liner, 25. Hingedly mounted to the portion 8, at 15, is a semi-circular member 14 from the free end of which projects a locking arm 16, having the upper end thereof tapered and angularly turned to form a hook 17 which may be engaged by a forward bar 19 on a keeper 18 positioned on the arm 7. Projected through one wall of the keeper 18 is a set screw adapted to engage the arm 7 and serve to bind the arm 16 in close relation to the arm 7. However, mounted on the arm 7 is a stop member 21 made from rubber, or some other suitable yieldable material, against which the arm 16 engages when drawn into close position by means of the set screw 20. Formed in the arm 7, at the lower end thereof, is a slot 23 in which may be positioned a strip of emery cloth or other polishing material, the cloth 24 being adapted to extend around the interior of the portions 8 and 14, and the opposite end thereof engaged in a slot 22 formed in the arm 16. If desired, suitable set screws may be provided for binding the ends of the emery cloth in the slots, or the same may be pressed in the slots for snug engagement.

In operation, a pair of crankshafts 26 and 27 are mounted upon a suitable lathe, or other machine, adapted for rotating the crankshafts in unison. This machine forms no part of this invention and therefore, is not set out in detail in the specification or drawings. The members 9 and 10 are mounted in one of the cranks of the crankshaft 27, opposite to the crank on the crankshaft 26 which it is desired to polish. The portion 8 is then brought into engagement with the crank to be polished and the arm 16 swung into parallel position with the arm 7 and locked in this position by means of the keeper 18 and the set screw 20. The use of the yieldable block 21 permits a certain amount of adjustment of the polishing member on the crank, while, at the same time, affording a rigid and durable assembly of parts. When the parts are mounted on the cranks as set out the shafts 26 and 27 are then set into rotation until the desired amount of polishing on the crank is obtained.

In the modified form shown in Fig. 5, I have projected a bolt 28 through the arm 7 and mounted a wing nut 29 on said bolt. In embracing relation with the bolt 28, between the arm 7 and the wing nut 29 is positioned a spiral spring 30. On the opposite end of the bolt 28 are pivotally mounted a pair of links 31 and 31', between which is pivotally mounted a pawl 32 adapted to be swung downwardly relatively to the arm 16 and for engagement in the recess 33, so that the links 31 and 31' embrace the arm 16.

It is thus seen that with a device of this nature, the polishing of the crank can be more efficiently accomplished, with less manual labor and a consequent reduction of cost. If desired, the babbit, or lining, 25 may be dispensed with and a polishing member mounted on this end of the device so that a pair of cranks may be polished simultaneously.

While I have illustrated and described the preferred form of construction, I do not wish to limit myself to the precise details of structure set forth, but desire to avail myself of such variations and modifications as come within the scope of the appended claims.

Having thus described my invention, what I claim as new and desire to secure by Letters Patent is:—

1. A crankshaft polisher comprising a carrying arm; a polishing member associated with said arm adjacent one end thereof and adapted for mounting on a crank to be polished; and a bearing member associated with said arm adjacent the opposite end thereof adapted for mounting on a member movable in harmony with the crankshaft to be polished.

2. A crankshaft polisher comprising an arm; an arcuate portion formed on said arm at opposite sides thereof; co-operating arcuate parts hingedly connected to and associated with said arcuate parts, one of said cooperating arcuate parts being provided with a radially outwardly extending locking arm; a means on said first mentioned arm for engaging said locking arm.

3. A crankshaft polisher comprising a sectional polishing member adapted for mounting on a crank in an embracing relation; a locking arm associated therewith; and means for engaging said locking arm for locking said parts in embracing relation on said crank; and a bearing connected with said polisher adapted for mounting on a co-ordinately moving crank.

4. A crankshaft polisher comprising a carrying arm; a bearing associated with said arm, adjacent one end thereof, adapted for mounting on a rotatable member; a polishing member associated with said arm at the opposite end thereof adapted for mounting on a crank to be polished; a locking arm projecting from said polishing member; means on said carrying arm for engaging said locking arm for retaining said polishing member in operative relation to said crank; and a yieldable abutment member on said arm for engaging said locking arm.

In testimony whereof I have signed the foregoing specification.

LEO RENO.